E. B. DIKEMAN.
HARROW.
APPLICATION FILED MAY 27, 1912.

1,040,524.

Patented Oct. 8, 1912.

2 SHEETS—SHEET 1.

Witnesses:
C. E. Wessels.
B. J. Richards.

Inventor:
Edmund B. Dikeman,
By Joshua R. H. Potts
his Attorney.

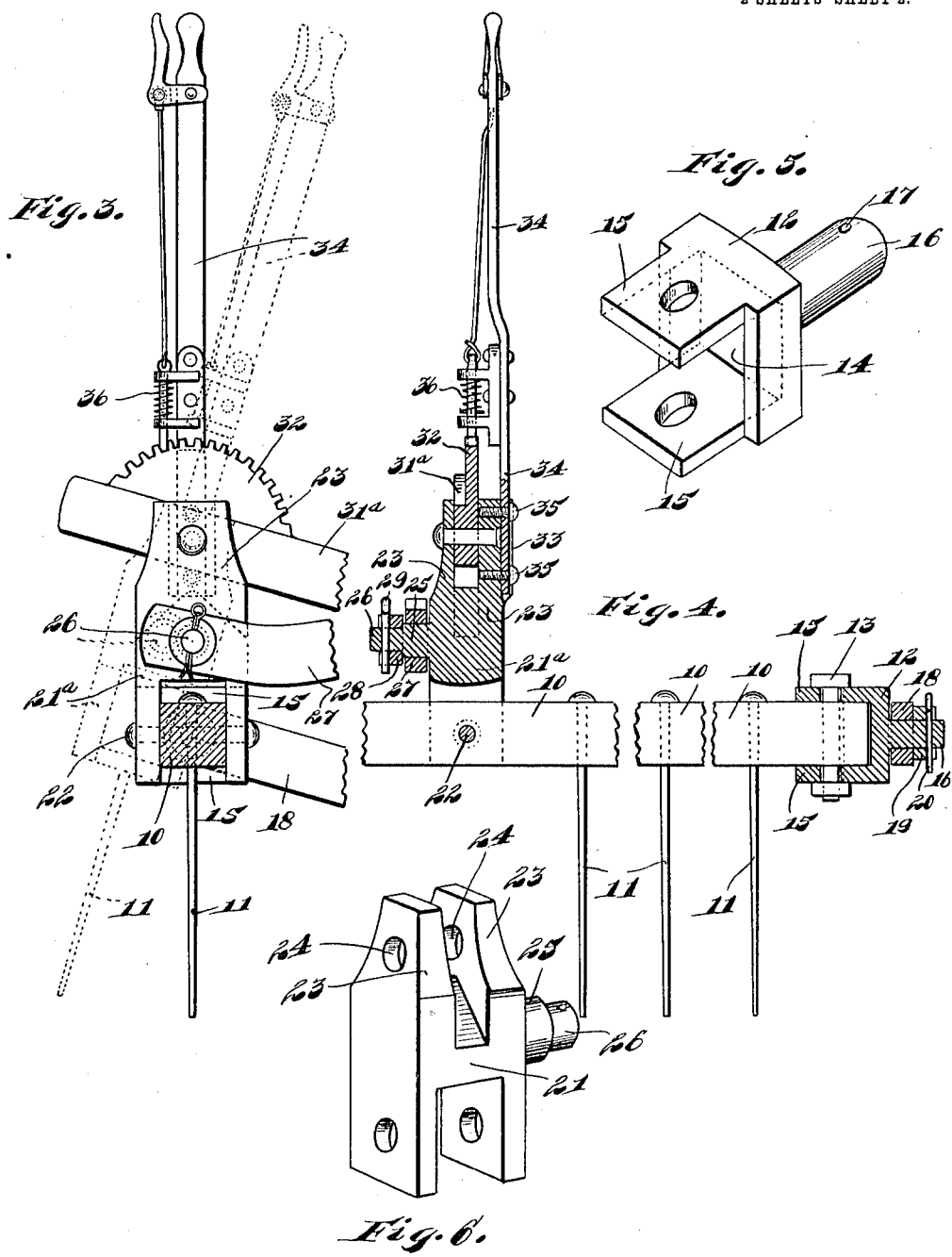

UNITED STATES PATENT OFFICE.

EDMUND B. DIKEMAN, OF CHICAGO, ILLINOIS.

HARROW.

1,040,524.  Specification of Letters Patent.  Patented Oct. 8, 1912.

Application filed May 27, 1912. Serial No. 699,920.

*To all whom it may concern:*

Be it known that I, EDMUND B. DIKEMAN, a citizen of the United States, and a resident of the city of Chicago, county of Cook, and State of Illinois, have invented certain new and useful Improvements in Harrows, of which the following is a specification.

This invention relates to harrows, particularly to flexible harrows, wherein the implement will adapt itself to accommodate all irregularities occurring in the surface operated upon.

It is also the object of the present invention to provide a mechanism whereby the tine bars may be provided with a relative bodily movement, and also to provide a means whereby the angle of the tines to the horizontal plane may be adjusted irrespective of the relative position of the tine bars.

With the above and other objects in view, this invention consists in the construction, combination, and arrangement of parts, all as hereinafter more fully described, claimed, and illustrated in the accompanying drawings wherein:—

Figure 1:
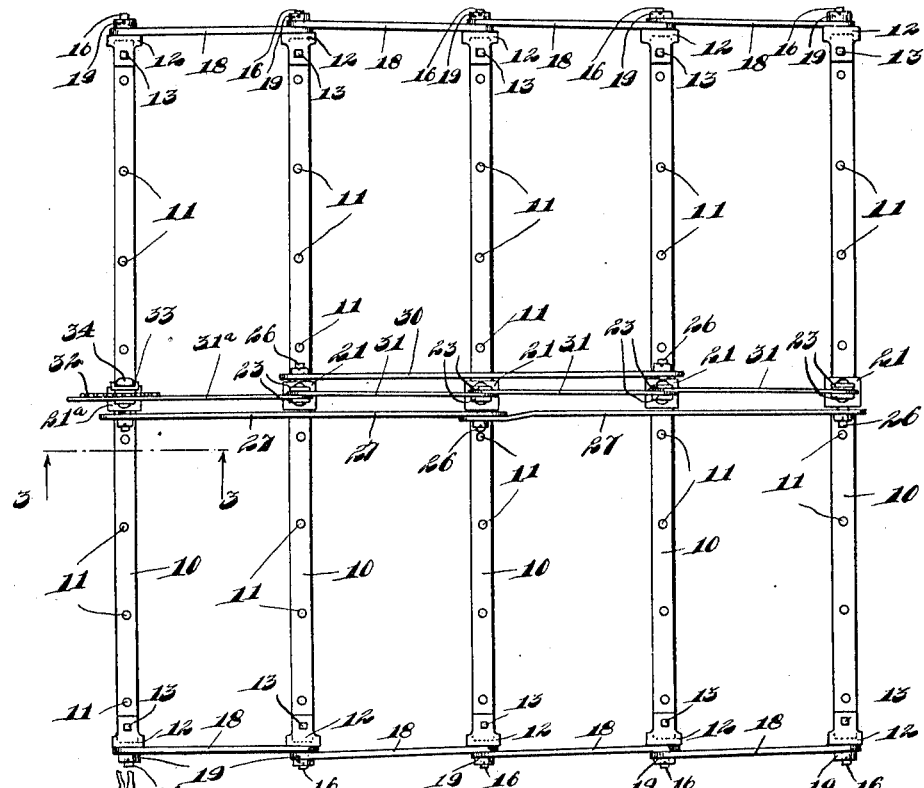
Figure 2:
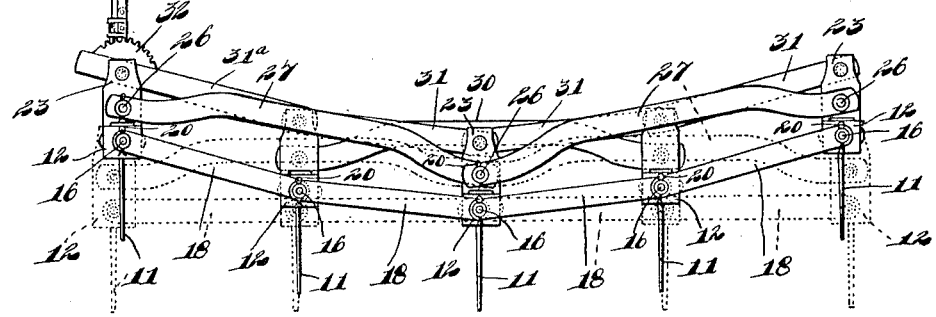

Figure 1 is a top plan view of a harrow constructed in accordance with the present invention, Fig. 2 is a side elevation thereof, illustrating the relative position of the elements thereof when said harrow adapts itself to accommodate a concavity in the ground, illustrating in dotted lines the normal position of the elements, Fig. 3 is a section taken along line 3—3 of Fig. 1, illustrating in dotted lines the angular adjustment of the tines, Fig. 4 is a central section of the lever illustrated in Fig. 3, illustrating the connections between the terminals of the tine bars and the connecting links, Fig. 5 is a perspective view of the fork connection mounted at the terminal of each tine bar, Fig. 6 is a similar view of the bearings and connecting forks mounted medially upon the tine bars.

Reference being had more particularly to the drawings, 10 indicates a plurality of rectangular tine bars, preferably five in number, though any number thereof may be used, each tine bar being provided with a number of normally vertical tines 11. Each terminal of each tine bar is spanned by a fork 12 which entirely incases the terminal of said tine bar and is secured thereto by means of the bolts 13 which pierce the arms 15 of the fork, said fork being provided with a casing 14 adjacent to the arms 15 to prevent any lateral displacement of the fork about the bolt 13 as a pivot. The outer face of each fork connection is provided with a stud 16 which extends horizontally and is pierced at its outer terminal by a vertical opening 17. The studs 16 constitute bearings for the overlapping links 18 interposed between the terminals of the tine bars 10, the studs attached to the central bars having two links secured thereto, while the studs of the outer bars have only one link secured thereto. These links constitute the flexible and pivotal connections between the bars and are retained in their operative positions by the grooved washers 19 which are received on the protruding terminals of the studs 16, and which are retained in position by the cotter pins 20 which project through the openings 17.

A fork 21 is secured to one of the end bars 10 and to the central bars 10, while a fork 21ª is secured to the opposite end bar 10. All of these forks are secured to the bars 10 by means of the bolts 22 piercing the arms of said forks and said bars. Each fork 21 and also the fork 21ª is provided with a pair of upwardly extending arms 23 which are pierced by the registering orifices 24, the utility of which will hereinafter be more fully described. A stud 25 is formed upon one side of each fork 21, each stud being provided with the reduced extension 26 for the reception of a lock washer and cotter pin. In the harrow illustrated, wherein only five bars are utilized, the stud 25 of the forks mounted upon the extreme bars 10 and upon the central bar 10 extend in one direction, while the studs 25 of the intermediate bars 10 extend in the opposite direction, as clearly illustrated in Figs. 1 and 2.

The arched yokes 27 are interposed between the extreme bars 10 and the central bar 10, said yokes being pivoted to the studs 25 of the extreme forks 21 and 21ª mounted upon the extreme bars 10 and upon the central bar 10, and are retained in position by the washers and cotter pins 28 and 29, respectively, mounted upon the extensions 26. The arch of these yokes permits the extreme bars 10 to operate downwardly without any interference by the intermediate tine bars. The forks of the intermediate tine bars, which are arranged oppositely to those of the central and extreme tine bars, are connected by an arched yoke 30 which spans the central bar 10 and permits the intermediate bars to operate downwardly if desired.

The upwardly extending arms 23 of the forks are connected by the links 31 which are interposed between said arms and retained therein by bolts piercing the registering openings 24 thereof. A link 31ª is interposed between the arms 23 of the fork 21ª and the next adjacent fork 21, said last named link being provided with a quadrant 32 upon its upper surface. A socket 33 is arranged upon one side of the arch 23 of the fork 21ª, and has a lever 34 rigidly secured therein by the screws or bolts 35. This lever carries a spring actuated pawl 36, operated in the usual manner, which coöperates with the teeth of the quadrant, as will hereinafter be more fully pointed out. It will clearly be seen that, as the lever 34 is oscillated, the entire fork 21ª will move about the pivotal connection between the same and the link 31ª. When the lever 34 assumes the position illustrated in dotted lines in Fig. 3, the bar 10 and the coöperating tines 11 will likewise assume the same position, the link connection between the remainder of the bars and the bar 10 carrying the fork 21ª creating a similar movement by all of the bars of the harrow.

It will be understood that any number of tine bars 10 may be provided, and that the entire elements thereof may be constructed of wood or metal, the construction being identical in either instance.

Having described my invention, what I claim as new and desire to secure by Letters Patent, is:

1. The combination with a plurality of tine bars and coöperating tines; of links pivotally connected to the terminals of said tine bars; yokes medially connecting the alternate tine bars; and means coöperative with said yokes for imparting a simultaneous adjustment to the angle of the tines to the horizontal plane.

2. The combination with a plurality of tine bars and coöperating tines; of links pivotally connected to the terminals of said tine bars; yokes medially connecting the alternate tine bars; and links medially interposed between said tine bars and pivotally connecting the same arranged adjacent to the yokes aforesaid.

3. The combination with a plurality of tine bars and coöperating tines; of links interposed between the terminals of said tine bars; arched yokes medially connecting the alternate tine bars; links arranged adjacent to said yokes and pivotally interposed between said tine bars; and means coöperating with said medially arranged links, whereby the angles of the tines aforesaid to the horizontal plane may be adjusted.

4. The combination with a plurality of tine bars and coöperating tines; of links interposed between the terminals of said tine bars; arched yokes medially connecting the alternate tine bars; links arranged adjacent to said yokes and pivotally interposed between said tine bars; a quadrant formed on one of said medially arranged links; and a lever rigidly secured to the bar adjacent to said quadrant and coöperating therewith for simultaneously adjusting the angle of the tines to the horizontal plane.

In testimony whereof I have signed my name to this specification in the presence of two subscribing witnesses.

EDMUND B. DIKEMAN.

Witnesses:
JOSHUA R. H. POTTS,
MARIE CALLAGHAN.

---

Copies of this patent may be obtained for five cents each, by addressing the "Commissioner of Patents, Washington, D. C."